(12) United States Patent
Morishima et al.

(10) Patent No.: US 11,285,679 B2
(45) Date of Patent: Mar. 29, 2022

(54) DEVICE AND METHOD FOR PRODUCING PULTRUDED ARTICLE

(71) Applicant: MITSUBISHI HEAVY INDUSTRIES, LTD., Tokyo (JP)

(72) Inventors: Shunichi Morishima, Tokyo (JP); Toshio Kozasa, Tokyo (JP); Masatake Hatano, Tokyo (JP); Kazuaki Kishimoto, Tokyo (JP); Yukio Takeuchi, Tokyo (JP); Masayuki Yamashita, Tokyo (JP); Hitoshi Ojika, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 522 days.

(21) Appl. No.: 16/303,724

(22) PCT Filed: Jun. 26, 2017

(86) PCT No.: PCT/JP2017/023446
§ 371 (c)(1),
(2) Date: Nov. 21, 2018

(87) PCT Pub. No.: WO2018/012269
PCT Pub. Date: Jan. 18, 2018

(65) Prior Publication Data
US 2020/0391453 A1 Dec. 17, 2020

(30) Foreign Application Priority Data
Jul. 12, 2016 (JP) .............................. JP2016-137964

(51) Int. Cl.
*B29C 70/52* (2006.01)
*B29C 70/14* (2006.01)
(Continued)

(52) U.S. Cl.
CPC ............ *B29C 70/528* (2013.01); *B29C 70/14* (2013.01); *B29C 70/44* (2013.01); *B29C 70/521* (2013.01);
(Continued)

(58) Field of Classification Search
None
See application file for complete search history.

(56) References Cited

U.S. PATENT DOCUMENTS

2010/0086631 A1* 4/2010 Schleelein ............ B29C 70/525
425/155
2014/0251529 A1* 9/2014 Blot ........................ B29C 70/50
156/196

FOREIGN PATENT DOCUMENTS

JP 2010120320 A * 6/2010
JP 2010120320 A 6/2010

OTHER PUBLICATIONS

English Translation of JP 2010120320A (Year: 2010).*
(Continued)

*Primary Examiner* — Timothy Kennedy
*Assistant Examiner* — Olukorede Esan
(74) *Attorney, Agent, or Firm* — Hauptman Ham, LLP

(57) ABSTRACT

A device for producing a pultruded article is provided with: a mold in which an intermediate molded article comprising reinforcing fibers impregnated with a thermosetting resin is heated and hardened; and a pultrusion device that causes a pultruded article generated by heating and hardening the intermediate molded article in the mold to be pultruded from the mold. The mold comprises a pressing member that is elastically deformable and that presses the intermediate molded article.

6 Claims, 7 Drawing Sheets

(51) Int. Cl.
*B29C 70/44* (2006.01)
*B29K 101/10* (2006.01)
*B29L 31/30* (2006.01)

(52) U.S. Cl.
CPC ... *B29K 2101/10* (2013.01); *B29L 2031/3055* (2013.01); *B29L 2031/3067* (2013.01); *B29L 2031/3076* (2013.01)

(56) References Cited

OTHER PUBLICATIONS

Extended European Search Report for European Application No. 17827399.1 dated Jul. 5, 2019; 6pp.
Renato Bezerra et al. "Manufacturing of Complex Shaped Composite Parts Through the Combination of Pull-Braiding and Blow Moulding", 20th International Conference on Composite Materials, Jul. 19, 2015-Jul. 24, 2015, XP002792240, Copenhagen; 24 pp.

* cited by examiner

DEVICE AND METHOD FOR PRODUCING PULTRUDED ARTICLE

RELATED APPLICATIONS

The present application is a National Phase of International Application Number PCT/JP2017/023446 filed Jun. 26, 2017 and claims priority to Japanese Application Number 2016-137964 filed Jul. 12, 2016.

TECHNICAL FIELD

The present invention relates to a production device and a production method for a pultruded article.

BACKGROUND ART

A composite material obtained by mixing a reinforcing fiber with a plastic material is used for aircrafts, automobiles, and ships. As a method for molding the composite material, a molding method of compressing and shaping a prepreg sheet by using a mold is known (refer to PTL 1). In addition, as a method of molding the composite material, the following pultrusion method is known. An intermediate molded article having the reinforcing fiber impregnated with a thermosetting resin is introduced into the mold. The intermediate molded article is heated, cured, and molded, and the composite material is pultruded from the mold.

CITATION LIST

Patent Literature

[PTL 1] Japanese Unexamined Patent Application Publication No. 2010-120320

SUMMARY OF INVENTION

Technical Problem

A shape of the mold used for the pultrusion method is constant, and a pultruded article is formed to have a constant cross-sectional shape. For example, when a long pultruded article is produced, a thickness of the pultruded article needs to be changed in a longitudinal direction, in some cases. In the related art, the shape of the mold is constant. Accordingly, in a case where the thickness of the intermediate molded article to be introduced into the mold is changed, there is a possibility of poor quality in the produced pultruded article. For example, in a case where the intermediate molded article changed to be thicker is introduced into the mold, excessive pressure is applied to the intermediate molded article. As a result, there is a possibility of poor quality in the produced pultruded article, or there is a possibility that pultrusion may be unavailable. In addition, in a case where a thin intermediate molded article is introduced into the mold, the intermediate molded article may be insufficiently pressurized. As a result, there is a possibility of poor quality in the produced pultruded article.

The present invention aims to provide a production device and a production method for a pultruded article which can suppress poor quality in a produced pultruded article, even if there is a change in a thickness of an intermediate molded article introduced into a mold.

Solution to Problem

According to the present invention, there is provided a production device for a pultruded article. The production device includes a mold that heats and cures an intermediate molded article having a reinforcing fiber impregnated with a thermosetting resin, and a pultrusion device that pultrudes a pultruded article produced by heating and curing the intermediate molded article in the mold, from the mold. The mold has a pressure member which is elastically deformable and pressurizes the intermediate molded article.

In the present invention, it is preferable that the intermediate molded article is moved in a pultruding direction in the mold, that the pressure member includes a bag body having an internal space, that the bag body is elastically deformed from a first deformed state to a second deformed state so as to follow a change in an outer shape of the intermediate molded article moving in the pultruding direction, and that the production device further includes a pressure adjustment device that adjusts pressure of the internal space of the bag body so as to pressurize the intermediate molded article by using the same force in the first deformed state and the second deformed state.

In the present invention, it is preferable that the bag body includes a first bag body and a second bag body located so as to interpose at least a portion of the intermediate molded article between the first bag body and the second bag body, and that the pressure adjustment device adjusts the pressure of an internal space of the first bag body and the pressure of an internal space of the second bag body so that the first bag body and the second bag body pressurize the intermediate molded article by using the same force.

In the present invention, the production device may further include a temperature adjustment device that adjusts a temperature of the pressure member. It is preferable that the temperature adjustment device adjusts the temperature of the pressure member so that the intermediate molded article is heated and cured by using heat transferred to the intermediate molded article from the pressure member.

In the present invention, it is preferable that a plurality of the pressure members are disposed in a pultruding direction of the intermediate molded article, and that the temperature adjustment device adjusts the temperature of the plurality of pressure members so that mutually different calorific values are transferred to the intermediate molded article from each of the plurality of pressure members.

In the present invention, it is preferable that the production device further includes a shaping member that is supported by the pressure member, and that has a sliding surface slidable on a surface of the intermediate molded article so as to shape the intermediate molded article.

According to the present invention, there is provided a production method for a pultruded article. The production method includes a step of introducing an intermediate molded article having a reinforcing fiber impregnated with a thermosetting resin into a mold, a step of heating and pressurizing the intermediate molded article by using an elastically deformable pressure member disposed in the mold, and a step of pultruding a pultruded article produced by heating and curing the intermediate molded article in the mold, from the mold.

Advantageous Effects of Invention

According to the present invention, there are provided a production device and a production method for a pultruded article which can suppress poor quality in a produced pultruded article, even if there is a change in a thickness of an intermediate molded article introduced into a mold.

DESCRIPTION OF EMBODIMENTS

Hereinafter, embodiments according to the present invention will be described with reference to the drawings. However, the present invention is not limited thereto. In addition, configuration elements in the embodiments described below can be appropriately combined with each other. In some cases, some of the configuration elements may not be used.

[Production Device for Pultruded Article]

Figure 1:
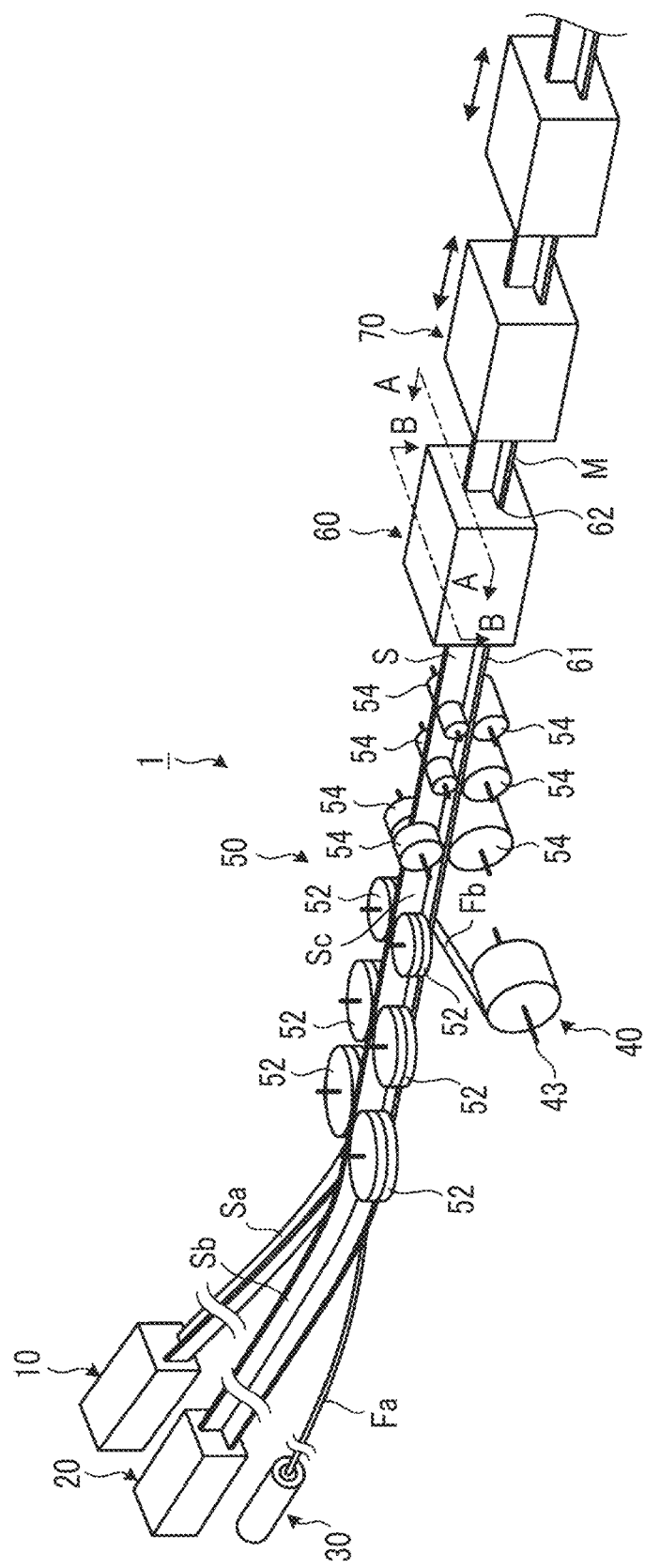
FIG. 1 is a view schematically illustrating an example of a production device for a pultruded article according to the present embodiment.

FIG. 1 is a view schematically illustrating an example of a production device 1 for a pultruded article according to the present embodiment. The production device 1 produces a pultruded article M by pultruding an intermediate molded article S having a reinforcing fiber impregnated with a thermosetting resin.

As illustrated in FIG. 1, the production device 1 includes a first preforming unit 10 that forms an intermediate molded article Sa, a second preforming unit 20 that forms an intermediate molded article Sb, a gap material supply unit 30 that supplies a gap material Fa, a reinforcing fiber sheet supply unit 40 that supplies a reinforcing fiber sheet Fb, the intermediate molded article Sa, a third preforming unit 50 that preliminarily forms the intermediate molded article Sa, the intermediate molded article Sb, the gap material Fa, and the reinforcing fiber sheet Fb so as to produce the intermediate molded article S, a mold 60 into which the intermediate molded article S produced by the third preforming unit 50 is introduced so as to heat and cure the intermediate molded article S, and a pultrusion device that pultrudes the pultruded article M produced by heating and curing of the intermediate molded article S in the mold 60, from the mold 60.

The first preforming unit 10 preliminarily forms the reinforcing fiber sheet so as to form the intermediate molded article Sa. The second preforming unit 20 preliminarily forms the reinforcing fiber sheet so as to form the intermediate molded article Sb.

Figure 2:
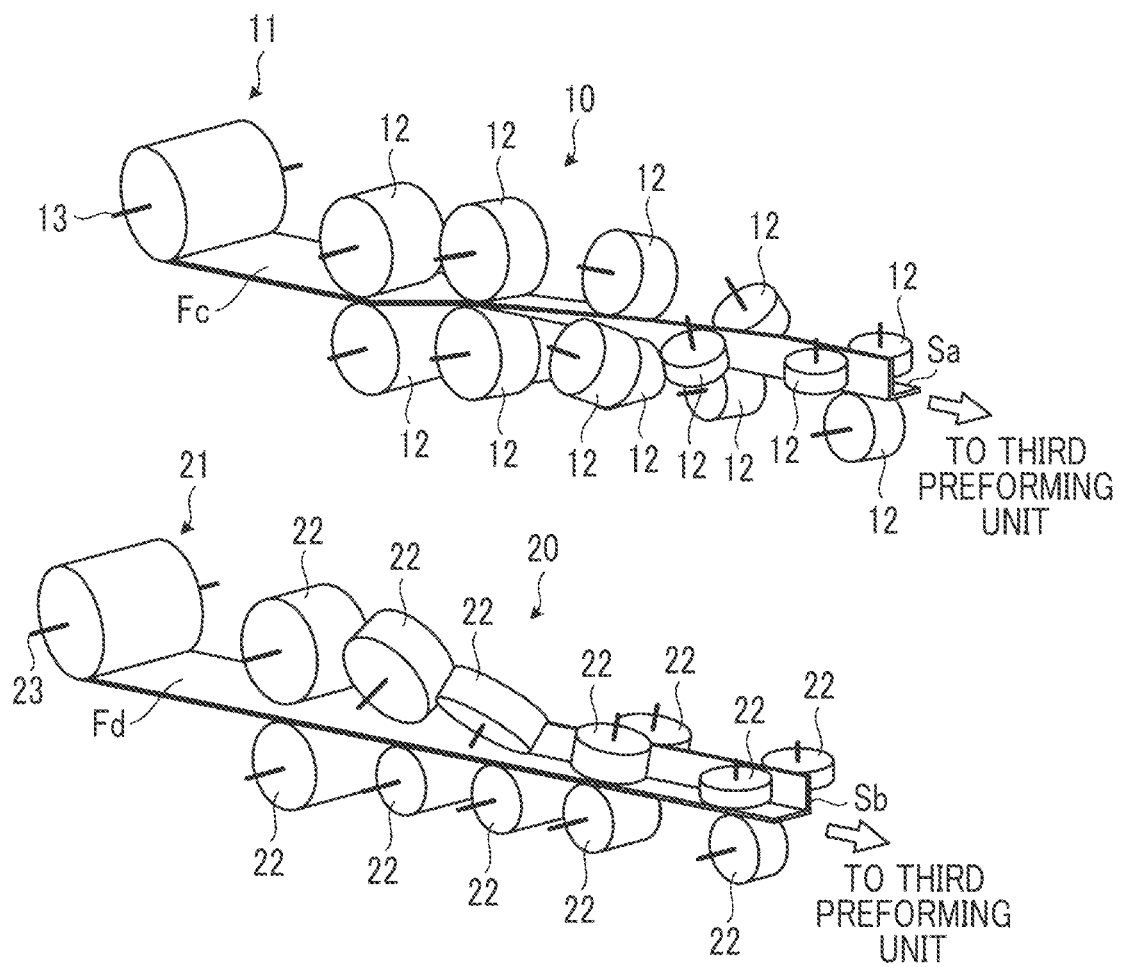
FIG. 2 is a view schematically illustrating an example of a first preforming unit and a second preforming unit according to the present embodiment.

FIG. 2 is a view schematically illustrating an example of the first preforming unit 10 and the second preforming unit 20 according to the present embodiment. As illustrated in FIG. 2, the first preforming unit 10 has a reinforcing fiber sheet supply unit 11 which supplies a reinforcing fiber sheet Fc, and a plurality of pressure rollers 12 which preliminarily form the reinforcing fiber sheet Fc supplied from the reinforcing fiber sheet supply unit 11.

The reinforcing fiber sheet supply unit 11 has a supply reel 13. The continuous reinforcing fiber sheet Fc is wound around the supply reel 13 in a roll shape. The reinforcing fiber sheet supply unit 11 feeds the reinforcing fiber sheet Fc out from the supply reel 13.

In the present embodiment, the reinforcing fiber sheet Fc supplied from the reinforcing fiber sheet supply unit 11 is a prepreg sheet. In the prepreg sheet, a plurality of reinforcing fibers are aligned in a sheet shape, and the sheet-shaped reinforcing fibers are impregnated with a thermosetting resin. The reinforcing fiber sheet Fc may be a preform sheet. In the preform sheet, the reinforcing fibers are not impregnated with the thermosetting resin.

In the present embodiment, the reinforcing fiber for forming the reinforcing fiber sheet Fc is a carbon fiber. The reinforcing fiber for forming the reinforcing fiber sheet Fc may be at least one of a plastic fiber, a glass fiber, and a metal fiber.

In a case where the reinforcing fiber sheet Fc is the prepreg sheet, the thermosetting resin impregnated into the reinforcing fiber includes at least one of an epoxy resin, an unsaturated polyester resin, a vinyl ester resin, a phenolic resin, a polyurethane resin, and a silicone resin.

In a case where the reinforcing fiber sheet Fc is the preform sheet, a step of impregnating the reinforcing fiber sheet Fc with the thermosetting resin is additionally performed before the reinforcing fiber sheet Fc is preliminarily formed. In this case, the thermosetting resin impregnated into the reinforcing fiber sheet Fc is the resin the same as the resin of the prepreg sheet.

The pressure rollers 12 preliminarily form the reinforcing fiber sheet Fc supplied from the reinforcing fiber sheet supply unit 11. The plurality of pressure rollers 12 are disposed in a transporting direction of the reinforcing fiber sheet Fc. Each of the plurality of pressure rollers 12 preforms a shape of the reinforcing fiber sheet Fc before the preforming using the third preforming unit 50 and the molding using the mold 60. The intermediate molded article Sa produced by preliminarily forming the reinforcing fiber sheet Fc is supplied to the third preforming unit 50.

The second preforming unit 20 has a reinforcing fiber sheet supply unit 21 which supplies a reinforcing fiber sheet Fd and a plurality of pressure rollers 22 which preliminarily form the reinforcing fiber sheet Fd supplied from the reinforcing fiber sheet supply unit 21.

The reinforcing fiber sheet supply unit 21 has a supply reel 23. The continuous reinforcing fiber sheet Fd is wound around the supply reel 23 in a roll shape. The reinforcing fiber sheet supply unit 21 feeds the reinforcing fiber sheet Fd out from the supply reel 23.

In the present embodiment, the reinforcing fiber sheet Fd supplied from the reinforcing fiber sheet supply unit 21 is the prepreg sheet. The reinforcing fiber sheet Fd may be the preform sheet. A material of the reinforcing fiber sheet Fd may be the same as or different from a material of the reinforcing fiber sheet Fc.

The pressure rollers 22 preliminarily form the reinforcing fiber sheet Fd supplied from the reinforcing fiber sheet supply unit 21. The plurality of pressure rollers 22 are disposed in the transporting direction of the reinforcing fiber sheet Fd. Each of the plurality of pressure rollers 22 preforms a shape of the reinforcing fiber sheet Fd before the preforming using the third preforming unit 50 and the molding using the mold 60. The intermediate molded article Sb produced by preliminarily forming the reinforcing fiber sheet Fd is supplied to the third preforming unit 50.

As illustrated in FIG. 1, the gap material supply unit 30 supplies the gap material Fa. In the present embodiment, the gap material Fa is the carbon fiber. The gap material Fa may be at least one of the plastic fiber, the glass fiber, and the metal fiber.

The reinforcing fiber sheet supply unit 40 supplies the reinforcing fiber sheet Fb. In the present embodiment, the reinforcing fiber sheet Fb supplied from the reinforcing fiber sheet supply unit 40 is the prepreg sheet. The reinforcing fiber sheet Fb may be the preform sheet.

In the present embodiment, the reinforcing fiber for forming the reinforcing fiber sheet Fb is the carbon fiber. The reinforcing fiber for forming the reinforcing fiber sheet Fb may be at least one of the plastic fiber, the glass fiber, and the metal fiber.

In a case where the reinforcing fiber sheet Fb is the prepreg sheet, the thermosetting resin impregnated into the reinforcing fiber includes at least one of the epoxy resin, the unsaturated polyester resin, the vinyl ester resin, the phenolic resin, the polyurethane resin, and the silicone resin.

In a case where the reinforcing fiber sheet Fb is the preform sheet, a step of impregnating the reinforcing fiber sheet Fb with the thermosetting resin is additionally performed before the reinforcing fiber sheet Fb is preliminarily formed. In this case, the thermosetting resin impregnated into the reinforcing fiber sheet Fb is the resin the same as the resin of the prepreg sheet.

The material of the reinforcing fiber sheet Fb may be the same as at least one of the material of the reinforcing fiber sheet Fc and the material of the reinforcing fiber sheet Fd, or may be different from the material of the reinforcing fiber sheet Fc and the material of the reinforcing fiber sheet Fd.

The reinforcing fiber sheet supply unit 40 has a supply reel 43. The continuous reinforcing fiber sheet Fb is wound around the supply reel 43 in a roll shape. The reinforcing fiber sheet supply unit 40 feeds the reinforcing fiber sheet Fb out from the supply reel 43.

The third preforming unit 50 produces the intermediate molded article S by preliminarily forming the intermediate molded article Sa produced in the first preforming unit 10, the intermediate molded article Sb produced in the second preforming unit 20, the gap material Fa supplied from the gap material supply unit 30, and the reinforcing fiber sheet Fb supplied from the reinforcing fiber sheet supply unit 40.

The third preforming unit 50 has a plurality of pressure rollers 52 which produce an intermediate molded article Sc by combining and preliminarily forming the intermediate molded article Sa, the intermediate molded article Sb, and the gap material Fa, and a plurality of pressure rollers 54 which produce the intermediate molded article S by combining and preliminarily forming the intermediate molded article Sc produced by the pressure rollers 52 and the reinforcing fiber sheet Fb with each other.

In the third preforming unit 50, the intermediate molded article Sa, the intermediate molded article Sb, the gap material Fa, and the reinforcing fiber sheet Fb are combined with one another. The third preforming unit 50 preforms a shape of the intermediate molded article S before the molding using the mold 60.

The third preforming unit 50 produces the intermediate molded article S having the reinforcing fiber impregnated with the thermosetting resin. In the present embodiment, at least one of the reinforcing fiber sheet Fb, the reinforcing fiber sheet Fc, and the reinforcing fiber sheet Fd is the prepreg sheet having the reinforcing fiber impregnated with the thermosetting resin. The intermediate molded article S includes the prepreg sheet.

The mold 60 performs the molding by heating and curing the intermediate molded article S supplied from the third preforming unit 50 and having the reinforcing fiber impregnated with the thermosetting resin. The mold 60 heats the intermediate molded article S so that the thermosetting resin included in the intermediate molded article S is changed from a semi-cured state to a cured state.

The thermosetting resin in the semi-cured state means that the state is harder than a softened state but is not a completely cured state, and means a state where thermosetting reaction is available by heating the thermosetting resin. The thermosetting resin in the semi-cured state has self-supporting capability, and can hold a shape even in a state without being supported by a support.

The thermosetting resin in the cured state is in a state after the thermosetting resin is cured, and means a state where the thermosetting reaction is not available even by heating the thermosetting resin. The thermosetting resin in the cured state has the self-supporting capability, and can hold the shape even in the state without being supported by the support.

The thermosetting resin in the softened state is in a state before the thermosetting resin is cured, and means a state where the thermosetting reaction is available by heating the thermosetting resin. The thermosetting resin in the softened state does not have the self-supporting capability, and cannot hold the shape in the state without being supported by the support.

The thermosetting resin included in the intermediate molded article S is heated and cured in the mold 60, thereby forming the pultruded article M.

The mold 60 has an entrance 61 of the intermediate molded article S and an exit 62 of the pultruded article M produced in the mold 60. The intermediate molded article S supplied from the third preforming unit 50 is introduced into the mold 60 via the entrance 61.

The pultrusion device 70 pultrudes the pultruded article M from the mold 60. The pultrusion device 70 pultrudes the pultruded article M produced by heating and curing the intermediate molded article S introduced inside the mold 60, from the mold 60.

In the present embodiment, the intermediate molded article Sa is continuously supplied from the first preforming unit 10. The intermediate molded article Sb is continuously supplied from the second preforming unit 20. The gap material Fa is continuously supplied from the gap material supply unit 30. The reinforcing fiber sheet Fb is continuously supplied from the reinforcing fiber sheet supply unit 40. The intermediate molded article S is continuously introduced into the mold 60 from the entrance 61 of the mold 60. The pultrusion device 70 continuously pultrudes the pultruded article M. That is, in the present embodiment, the production device 1 performs continuous pultrusion.

[Mold]

Figure 3:
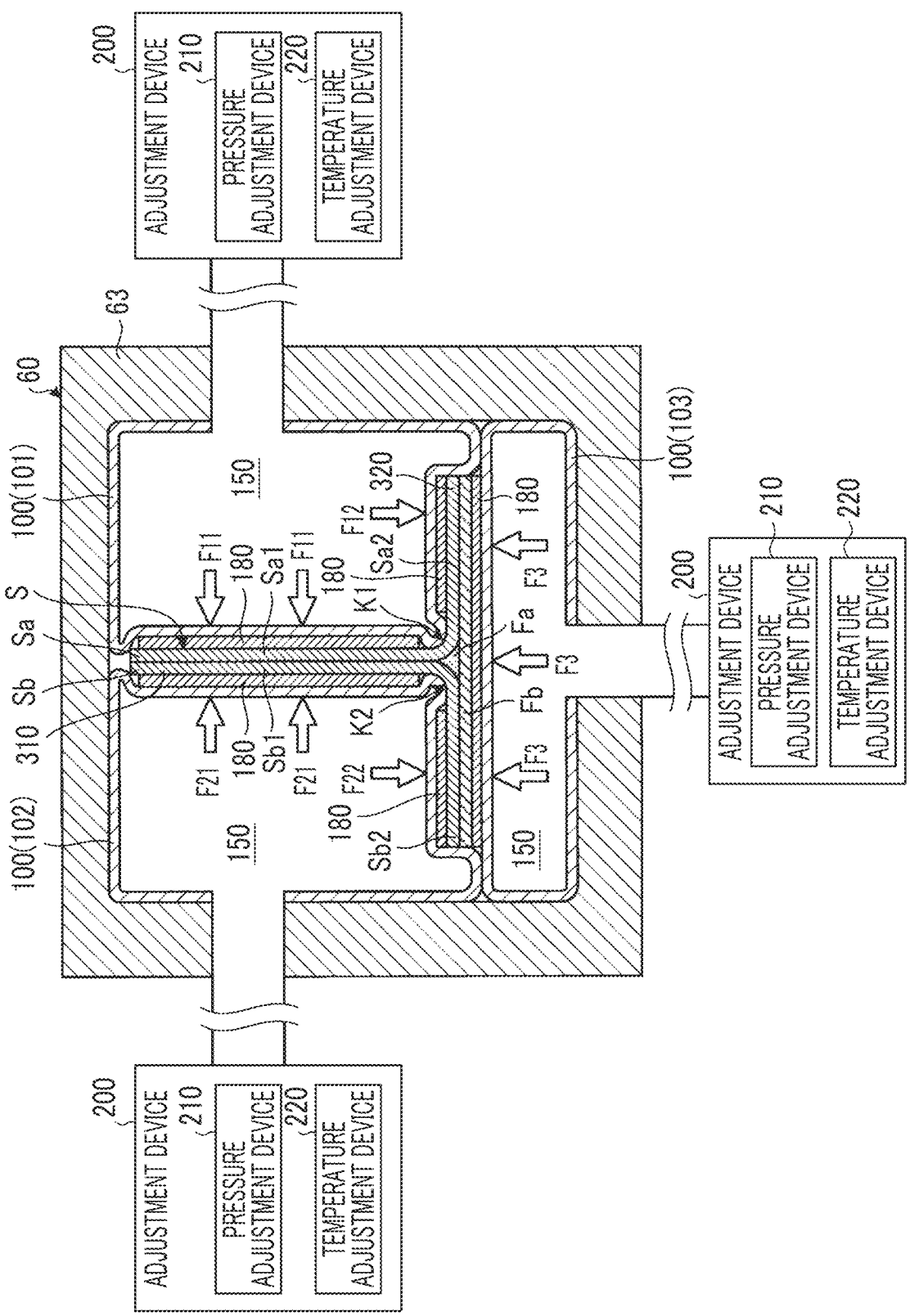
FIG. 3 is a sectional view schematically illustrating a mold according to the present embodiment.
Figure 4:
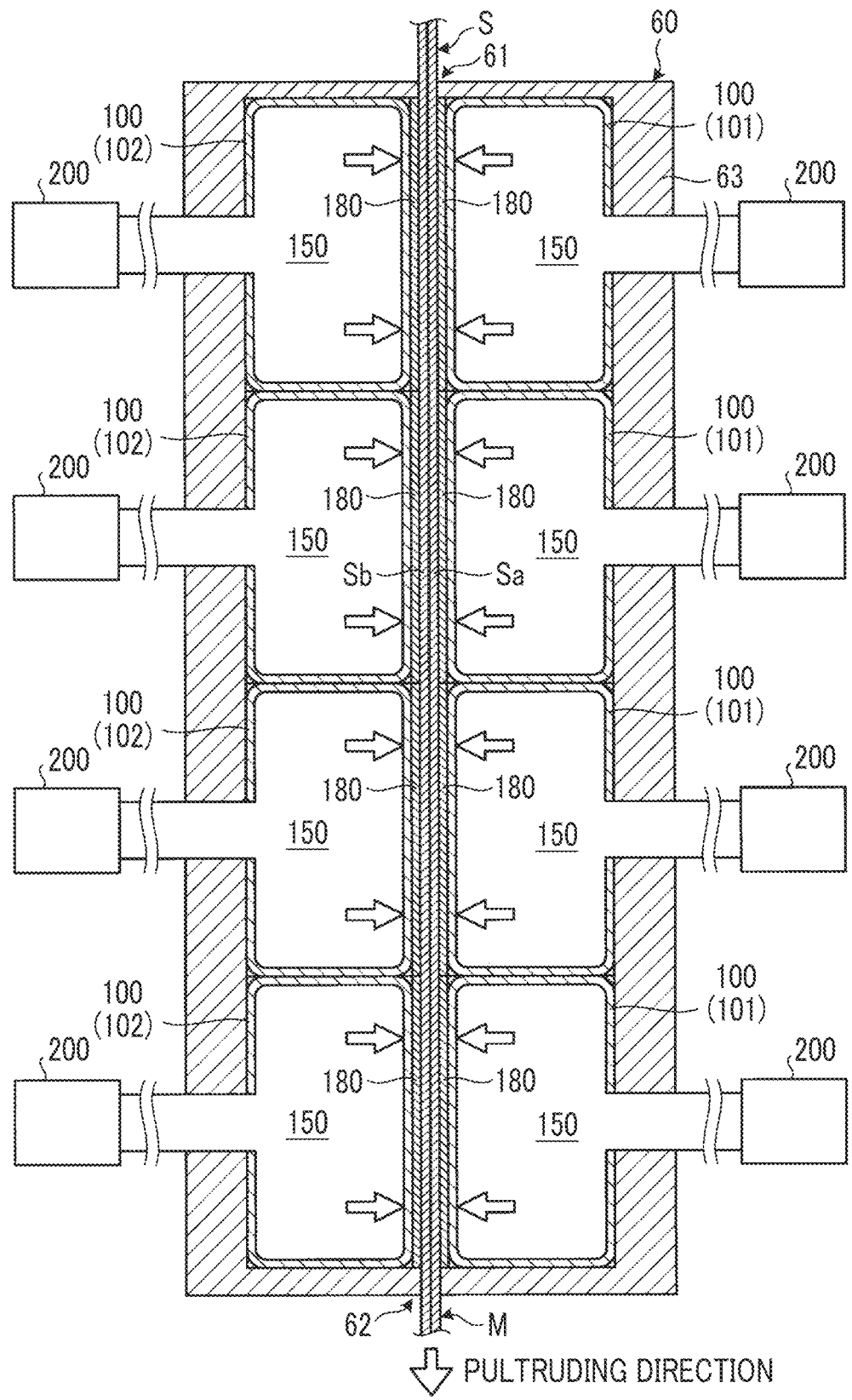
FIG. 4 is a sectional view schematically illustrating a mold according to the present embodiment.

FIG. 3 is a sectional view schematically illustrating the mold 60 according to the present embodiment, and corresponds to a view taken along line A-A in FIG. 1. FIG. 4 is a sectional view schematically illustrating the mold 60 according to the present embodiment, and corresponds to a view taken along line B-B in FIG. 1.

As illustrated in FIGS. 3 and 4, the mold 60 has a housing 63 and a pressure member 100 disposed inside the housing 63 so as to pressurize the intermediate molded article S introduced into the mold 60.

The pressure member 100 is elastically deformable. In the present embodiment, the pressure member 100 is a bag body having an internal space 150. In the following description, the pressure member 100 will be appropriately referred to as a bag body 100.

For example, the bag body 100 is made of silicone rubber, and is elastically deformable. In the present embodiment, the bag body 100 is a balloon-like member. The internal space 150 of the bag body 100 accommodates a fluid. The fluid in the internal space 150 may be gas or a liquid.

In addition, The mold 60 has the entrance 61 disposed in the housing 63 so as to transport the intermediate molded article S into the housing 63 and the exit 62 disposed in the housing 63 so as to transport the pultruded article M produced by heating and curing the intermediate molded article S in the mold 60, outward of the housing 63. The intermediate molded article S enters the inside of the housing 63 via the entrance 61, moves inside the housing 63, and thereafter, exits the housing via the exit 62. In the following description, a movement direction of the intermediate molded article S in the mold 60 will be appropriately referred to as a pultruding direction.

In the present embodiment, the bag body 100 is located so as to face the intermediate molded article S via a shaping member 180. The shaping member 180 is supported by the bag body 100. The shaping member 180 is a plate-shaped member, and has rigidity higher than that of the bag body 100. In the present embodiment, the shaping member 180 is a metal-made plate member. The shaping member 180 may be a plate member made of reinforced plastic.

The shaping member 180 is located so as to be in contact with a surface of the intermediate molded article S. The shaping member 180 has a sliding surface which comes into contact with the surface of the intermediate molded article S and which is slidable on the surface of the intermediate molded article S. When the intermediate molded article S moves in the pultruding direction, the shaping member 180 slides on the intermediate molded article S. The shaping member 180 shapes the intermediate molded article S by coming into contact with the surface of the intermediate molded article S moving in the pultruding direction.

For example, a lubricant such as a silicone resin or a fluororesin is disposed on the sliding surface of the shaping member 180 which slides on the surface of the intermediate molded article S. In this manner, slidability is ensured between the shaping member 180 and the intermediate molded article S.

A portion of the bag body 100 to which the shaping member 180 is not connected or a portion which does not face the intermediate molded article S is supported by an inner surface of the housing 63.

The production device 1 includes an adjustment device 200 which adjusts a state of the bag body 100. The adjustment device 200 has a pressure adjustment device 210 which adjusts pressure of the internal space 150 of the bag body 100 and a temperature adjustment device 220 which adjusts a temperature of the bag body 100. The temperature adjustment device 220 adjusts the temperature of the bag body 100 by adjusting the temperature of the fluid in the internal space 150.

The pressure adjustment device 210 can raise the pressure of the internal space 150 by supplying the fluid to the internal space 150. The pressure adjustment device 210 can lower the pressure of the internal space 150 by suctioning the fluid in the internal space 150.

In a case where the intermediate molded article S is moved in the pultruding direction in the mold 60 while the thickness of the intermediate molded article S introduced into the mold 60 via the entrance 61 is changed, the bag body 100 is elastically deformed so as to follow a change in an outer shape (change in the thickness) of the intermediate molded article S moving in the pultruding direction. The portion of the bag body 100 to which the shaping member 180 is not connected or the portion which does not face the intermediate molded article S is supported by the inside of the housing 63. Therefore, a portion of the bag body 100 to which the shaping member 180 is connected or a portion which faces the intermediate molded article S can be elastically deformed (displaced) so as to follow the change in the thickness of the intermediate molded article S, based on the inner surface of the housing 63.

For example, when the intermediate molded article S having a first thickness comes into contact with the shaping member 180 supported by the bag body 100, the bag body 100 is deformed into a first deformed state. When the intermediate molded article S having a second thickness different from the first thickness comes into contact with the shaping member 180 supported by the bag body 100, the bag body 100 is deformed in a second deformed state different from the first deformed state. A deformed state of the bag body 100 indicates the amount of displacement of the portion of the bag body 100 to which the shaping member 180 is connected, or the portion which faces the intermediate molded article S.

In the present embodiment, the pressure adjustment device 210 adjusts the pressure of the internal space 150 of the bag body 100 so that the bag body 100 pressurizes the intermediate molded article S by using the same force in both the first deformed state and the second deformed state. That is, the pressure adjustment device 210 adjusts the pressure of the internal space 150 of the bag body 100 so that a force of the bag body 100 pressurizing the intermediate molded article S is always constant even if the bag body 100 is elastically deformed due to the change in thickness of the intermediate molded article S.

The temperature adjustment device 220 can raise the temperature of the fluid in the internal space 150 by heating the fluid supplied to the internal space 150. The temperature adjustment device 220 can lower the temperature of the fluid in the internal space 150 by cooling the fluid supplied to the internal space 150.

As illustrated in FIG. 3, in the present embodiment, a cross-sectional shape of the intermediate molded article S is a so-called T-shape. The intermediate molded article S has a first plate portion 310 and a second plate portion 320 substantially orthogonal to the first plate portion 310. A first bent portion K1 and a second bent portion K2 are disposed between the first plate portion 310 and the second plate portion 320.

The first plate portion 310 is formed by joining a portion of the intermediate molded article Sa and a portion of the intermediate molded article Sb to each other. The second plate portion 320 is formed by joining a portion of the intermediate molded article Sa and a portion of the intermediate molded article Sb to the reinforcing fiber sheet Fb.

In the following description, a portion for forming the first plate portion 310 in the intermediate molded article Sa will be appropriately referred to as a portion Sa1, and a portion for forming the second plate portion 320 in the intermediate molded article Sa will be appropriately referred to as a portion Sat. The portion Sa1 and the portion Sat are linked to each other via the first bent portion K1.

In addition, in the following description, a portion for forming the first plate portion 310 in the intermediate molded article Sb will be appropriately referred to as a portion Sb1, and a portion for forming the second plate portion 320 in the intermediate molded article Sb will be appropriately referred to as a portion Sb2. The portion Sb1 and the portion Sb2 are linked to each other via the second bent portion K2.

The gap material Fa is located in a space among the first bent portion K1 of the intermediate molded article Sa, the first bent portion K2 of the intermediate molded article Sb, and the reinforcing fiber sheet Fb.

In a cross section orthogonal to the pultruding direction, a plurality of the bag bodies 100 are arranged around the intermediate molded article S. In the present embodiment, the bag body 100 includes a bag body 101 for pressurizing the intermediate molded article Sa, a bag body 102 for pressurizing the intermediate molded article Sb, and a bag body 103 for pressurizing the reinforcing fiber sheet Fb.

The bag body 101 and the bag body 102 are arranged so as to interpose the first plate portion 310 including the portion Sa1 and the portion Sb1 therebetween.

The bag body 101 and the bag body 103 are arranged so as to interpose a portion of the second plate portion 320 including a portion of the portion Sat and the reinforcing fiber sheet Fb.

The bag body 102 and the bag body 103 are arranged so as to interpose a portion of the second plate portion 320 including a portion of the portion Sb2 and the reinforcing fiber sheet Fb.

The bag body 101 is provided with the shaping member 180 which comes into contact with the surface of the portion Sa1 and the shaping member 180 which comes into contact with the surface of the portion Sat. The shaping member 180 which comes into contact with the surface of the portion Sa1 and the shaping member 180 which comes into contact with the surface of the portion Sat are separate from each other. The surface of the first bent portion K1 of the intermediate molded article Sa comes into contact with the bag body 101.

The bag body 102 is provided with the shaping member 180 which comes into contact with the surface of the portion Sb1 and the shaping member 180 which comes into contact with the surface of the portion Sb2. The shaping member 180 which comes into contact with the surface of the portion Sb1 and the shaping member 180 which comes into contact with the surface of the portion Sb2 are separate from each other. The surface of the second bent portion K2 of the intermediate molded article Sb comes into contact with the bag body 102.

The bag body 103 is provided with the shaping member 180 which comes into contact with the surface of the reinforcing fiber sheet Fb.

In addition, as illustrated in FIG. 4, the plurality of bag bodies 100 are disposed in the pultruding direction of the intermediate molded article S. In the present embodiment, every four of the bag body 101, the bag body 102, and the bag body 103 are respectively disposed in the pultruding direction of the intermediate molded article S.

The pressure adjustment device 210 adjusts the force of the bag body 100 pressurizing the intermediate molded article S by adjusting the pressure of the internal space 150 of the bag body 100.

In the present embodiment, the pressure adjustment device 210 adjusts the pressure of the internal space 150 of the bag body 101 and the pressure of the internal space 150 of the bag body 102 so that the bag body 101 and the bag body 102 which are arranged to interpose the first plate portion 310 of the intermediate molded article S therebetween pressurize the first plate portion 310 of the intermediate molded article S by using the same force.

Similarly, the pressure adjustment device 210 adjusts the pressure of the internal space 150 of the bag body 101 and the pressure of the internal space 150 of the bag body 103 so that the bag body 101 and the bag body 103 which are arranged to interpose a portion of the second plate portion 320 of the intermediate molded article S therebetween pressurize the second plate portion 320 of the intermediate molded article S by using the same force.

Similarly, the pressure adjustment device 210 adjusts the pressure of the internal space 150 of the bag body 102 and the pressure of the internal space 150 of the bag body 103 so that the bag body 102 and the bag body 103 which are arranged to interpose a portion of the second plate portion 320 of the intermediate molded article S therebetween pressurize the second plate portion 320 of the intermediate molded article S by using the same force.

That is, in the present embodiment, the pressure adjustment device 210 adjusts the pressure of the internal space 150 of the bag body 101 and the pressure of the internal space 150 of the bag body 102 so that a vector F11 and a vector F21 of the force illustrated in FIG. 3 are balanced. In addition, the pressure adjustment device 210 adjusts the pressure of the internal space 150 of the bag body 101 and the pressure of the internal space 150 of the bag body 102, and the pressure of the internal space 150 of the bag body 103 so that a vector F12, a vector F22, and a vector F3 of the force illustrated in FIG. 3 are balanced.

The temperature adjustment device 220 adjusts the temperature of the fluid in the internal space 150 so that the intermediate molded article S is heated and cured by the heat transferred from the bag body 100 to the intermediate molded article S. In the present embodiment, the intermediate molded article S is heated and cured by the heat supplied from the bag body 100 via the shaping member 180.

[Production Method of Pultruded Article]

Figure 5:
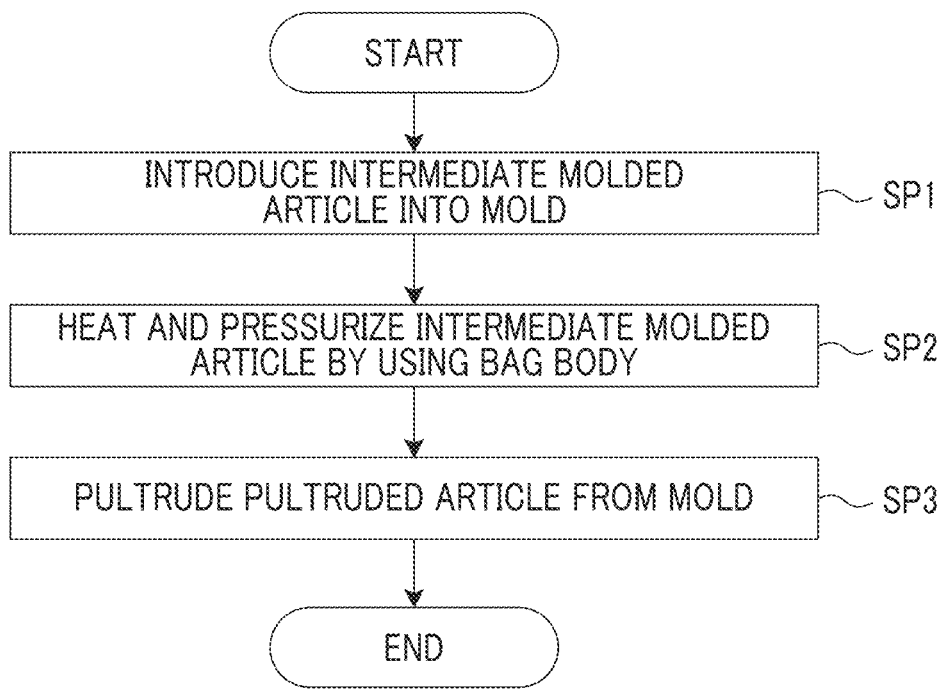
FIG. 5 is a flowchart illustrating an example of a production method for a pultruded article according to the present embodiment.
Figure 6:
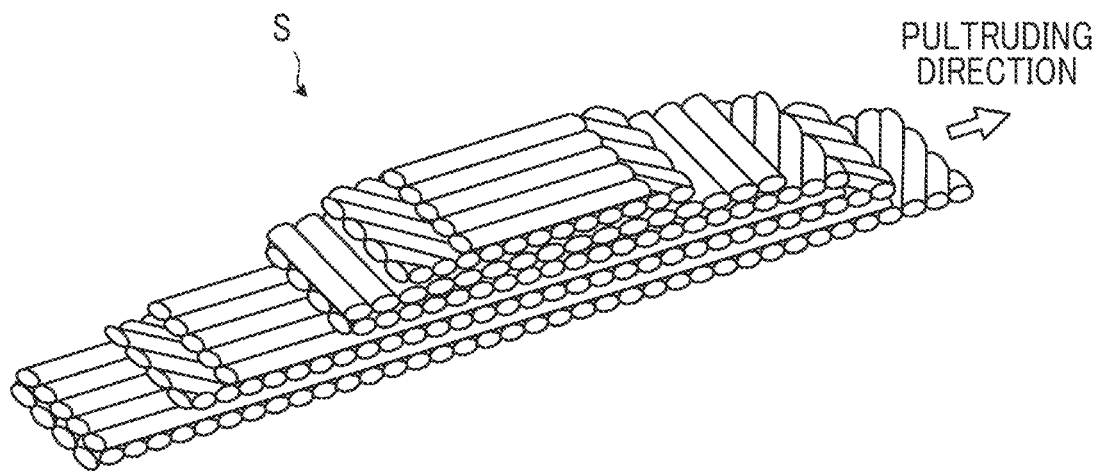
FIG. 6 is a view schematically illustrating a portion of an intermediate molded article according to the present embodiment.

Next, an example of a production method for the pultruded article M according to the present embodiment will be described. FIG. 5 is a flowchart illustrating the example of the production method for the pultruded article M according to the present embodiment. FIG. 6 is a view schematically illustrating a portion of the intermediate molded article S according to the present embodiment.

In the present embodiment, as schematically illustrated in FIG. 6, the thickness of at least a portion of the intermediate molded article S introduced into the mold 60 is changed. The intermediate molded article S is a stacked layer body having a plurality of reinforcing fiber sheets. As illustrated in FIG. 6, the thickness of the intermediate molded article S is changed by adjusting the number of layers of the reinforcing fiber sheets. For example, the thickness of the first plate portion 310 may be changed in the pultruding direction, or the thickness of the second plate portion 320 may be changed in the pultruding direction.

The intermediate molded article S whose thickness is changed in the pultruding direction is introduced into the mold 60 via the entrance 61 (Step SP1).

The pressure of the internal space 150 of the bag body 100 is adjusted by the pressure adjustment device 210 so that the intermediate molded article S is pressurized by the bag body 100. The temperature of the fluid in the internal space 150 of the bag body 100 is adjusted by the temperature adjustment device 220 so that the intermediate molded article S is heated and cured by the heat transferred from the bag body 100 to the intermediate molded article S.

The intermediate molded article S introduced into the mold 60 is heated and pressurized by coming into contact with the shaping member 180 supported by the bag body 100 (Step SP2). In this manner, the intermediate molded article S is heated and cured, thereby producing the pultruded article M.

The shaping member 180 is a highly rigid plate member. Therefore, the intermediate molded article S is very accurately molded since the shaping member 180 and the intermediate molded article S come into contact with each other. In addition, the shaping member 180 has the sliding surface which is slidable on the intermediate molded article S. Therefore, the intermediate molded article S smoothly moves in the pultruding direction while sliding on the shaping member 180.

The bag body 100 is elastically deformable. Therefore, even if there exists a portion which is less likely to come into contact with the shaping member 180 on the surface of the intermediate molded article S as in the first bent portion K1 and the second bent portion K2, the bag body 100 can be deformed along the outer shape of the intermediate molded article S, and can also come into contact with the surface of the first bent portion K1 and the surface of the second bent portion K2. In this manner, the intermediate molded article S is very accurately molded.

When the thickness of the intermediate molded article S introduced into the mold 60 is changed, the bag body 100 is elastically deformed in accordance with a change in the thickness of the intermediate molded article S. For example, in a case where the thick intermediate molded article S is introduced into the mold 60, a portion of the bag body 100 to which the shaping member 180 is connected or a portion of the bag body 100 which faces the intermediate molded article S is displaced so as to be closer to the inner surface of the housing 63. In a case where the thin intermediate molded article S is introduced into the mold 60, the portion of the bag body 100 to which the shaping member 180 is connected or the portion of the bag body 100 which faces the intermediate molded article S is displaced so as to be away from the inner surface of the housing 63. That is, the portion of the bag body 100 to which the shaping member 180 is connected or the portion of the bag body 100 which faces the intermediate molded article S is displaced so as to follow the change in the thickness of the intermediate molded article S, based on the inner surface of the housing 63.

When the bag body 100 is elastically deformed so as to follow the change in outer shape of the intermediate molded article S, the pressure adjustment device 210 adjusts the pressure of the internal space 150 of the bag body 100 so that the intermediate molded article S is always pressurized using a constant force by the bag body 100.

In addition, the pressure adjustment device 210 adjusts the pressure of the internal space 150 of the bag body 101 and the pressure of the internal space 150 of the bag body 102 so that the first plate portion 310 of the intermediate molded article S is pressurized using the same force by the bag body 101 and the bag body 102 which are arranged to interpose the first plate portion 310 of the intermediate molded article S therebetween.

Similarly, the pressure adjustment device 210 adjusts the pressure of the internal space 150 of the bag body 101 and the pressure of the internal space 150 of the bag body 103 so that the second plate portion 320 of the intermediate molded article S is pressurized using the same force by the bag body 101 and the bag body 103 which are arranged to interpose a portion of the second plate portion 320 of the intermediate molded article S therebetween.

Similarly, the pressure adjustment device 210 adjusts the pressure of the internal space 150 of the bag body 102 and the pressure of the internal space 150 of the bag body 103 so that the second plate portion 320 of the intermediate molded article S is pressurized using the same force by the bag body 102 and the bag body 103 which are arranged to interpose a portion of the second plate portion 320 of the intermediate molded article S therebetween.

In the present embodiment, the temperature adjustment device 220 adjusts the temperature of the fluid in the internal space 150 of each of the plurality of bag bodies 100 so as to have mutually different calorific values transferred to the intermediate molded article S from each of the plurality of bag bodies 100 arranged in the pultruding direction of the intermediate molded article S. In the present embodiment, the temperature of the fluid in the internal space 150 of each of the plurality of bag bodies 100 is adjusted so that the calorific value transferred from the bag body 100 to the intermediate molded article S gradually increases from the entrance 61 of the mold 60 toward the exit 62, and so that the temperature gradually decreases toward the exit 62 after the temperature reaches a peak.

The pultruded article M produced by heating and curing the intermediate molded article S in the mold 60 is pultruded from the mold 60 by the pultrusion device 70 (Step SP3).

[Operation and Advantageous Effect]

As described above, according to the present embodiment, the mold 60 for heating and curing the intermediate molded article S has the elastically deformable bag body 100. Accordingly, when the thickness of the intermediate molded article S introduced into the mold 60 is changed, the bag body 100 is elastically deformed in accordance with the change in the thickness of the intermediate molded article S. In this manner, in a case where the thick intermediate molded article S is introduced into the mold 60, it is possible to prevent excessive stress from acting on the intermediate molded article S. In addition, in a case where the thin intermediate molded article S is introduced into the mold 60, it is possible to prevent the intermediate molded article S from being insufficiently pressurized. Therefore, even if the thickness of the intermediate molded article S introduced into the mold 60 is changed, it is possible to prevent poor quality of the produced pultruded article M.

In addition, the balloon-shaped bag body 100 is employed as the elastically deformable pressure member 100. Accordingly, even if the intermediate molded article S having the bent portion or a corner portion as in the first bent portion K1 and the second bent portion K2 is introduced into the mold 60, the bag body 100 is deformed to conform to the outer shape of the intermediate molded article S. Therefore, the entire surface of the intermediate molded article S and the bag body 100 or the shaping member 180 can be sufficiently brought into contact with each other.

In addition, in the present embodiment, even if the thickness of the intermediate molded article S introduced into the mold 60 is changed, the pressure of the internal space 150 of the bag body 100 is adjusted by the pressure adjustment device 210 so that the intermediate molded article S is always pressurized using the constant force. Therefore, it is possible to prevent the intermediate molded article S from being excessively pressurized or insufficiently pressurized. Accordingly, the produced pultruded article M has uniform quality.

In addition, in the present embodiment, the intermediate molded article S is heated and pressurized while being interposed between the two bag bodies 100. In this manner, in a case where the thickness of the intermediate molded article S introduced into the mold 60 is changed, both the two bag bodies 100 are elastically deformed. The change in the thickness of the intermediate molded article S is absorbed by each of the two bag bodies 100. Accordingly, each elastically deformed amount of the two bag bodies 100 is suppressed. Excessive elastic deformation of the bag body 100 is suppressed. Accordingly, even if the thickness of the intermediate molded article S introduced into the mold 60 is greatly changed, it is possible to sufficiently correspond to the change in the thickness of the intermediate molded article S. In addition, the pressure of the internal space 150 of the two bag bodies 100 is adjusted so that the two bag bodies 100 pressurize the intermediate molded article S by using the same force. Accordingly, the elastically deformed amount of the two bag bodies 100 is uniform. For example, in the bag body 101 and the bag body 102 which interpose the first plate portion 310 therebetween, if the pressurizing force applied by the bag body 101 is weaker than the pressurizing force applied by the bag body 102, there is a possibility that the first plate portion 310 may be deviated or bent to the bag body 101 side. According to the present embodiment, the pressurizing force of the two bag bodies 100 is uniform. Accordingly, it is possible to prevent the intermediate molded article S from being deviated or bent to any one of the two bag bodies 100. Therefore, it is possible to prevent poor quality of the produced pultruded article M.

In addition, in the present embodiment, the temperature of the fluid in the internal space 150 of the bag body 100 is adjusted by the temperature adjustment device 220 so as to heat and cure the intermediate molded article S with the heat transferred from the bag body 100 to the intermediate molded article S. In this manner, it is possible to produce the pultruded article M by heating and curing the intermediate molded article S with the heat of the bag body 100 without separately providing a heater in the mold 60.

In addition, in the present embodiment, the plurality of bag bodies 100 are disposed in the pultruding direction of the intermediate molded article S. The temperature adjustment device 220 adjusts the temperature of the fluid in the internal space 150 of each of the plurality of bag bodies 100 so as to have mutually different calorific values transferred to the intermediate molded article S from each of the plurality of bag bodies 100. The calorific values transferred to the intermediate molded article S from the plurality of bag bodies 100 arranged in the pultruding direction are distributed. Accordingly, it is possible to adjust the quality of the produced pultruded article M. For example, the temperature of the fluid in the internal space 150 of each of the plurality of bag bodies 100 is adjusted so that the calorific value transmitted to the intermediate molded article S from the bag body 100 gradually increases from the entrance 61 of the mold 60 toward the exit 62. In this manner, the intermediate molded article S is gradually cured toward the exit 62, thereby producing the pultruded article M having high quality. In addition, the quality of the produced pultruded article M can also be adjusted by appropriately distributing the pressurizing force applied to the intermediate molded article S by the plurality of bag bodies 100 arranged in the pultruding direction.

In addition, in the present embodiment, the shaping member 180 having the sliding surface is disposed in the bag body 100. The bag body 100 supports the highly rigid shaping member 180 made of metal or reinforced plastic. Accordingly, the intermediate molded article S can be very accurately molded using the shaping member 180. In addition, for example, the lubricant is disposed on the contact surface of the shaping member 180 which comes into contact with the surface of the intermediate molded article S, thereby forming the sliding surface. Therefore, slidability is ensured between the shaping member 180 and the intermediate molded article S.

[Other Embodiments]

Figure 7:
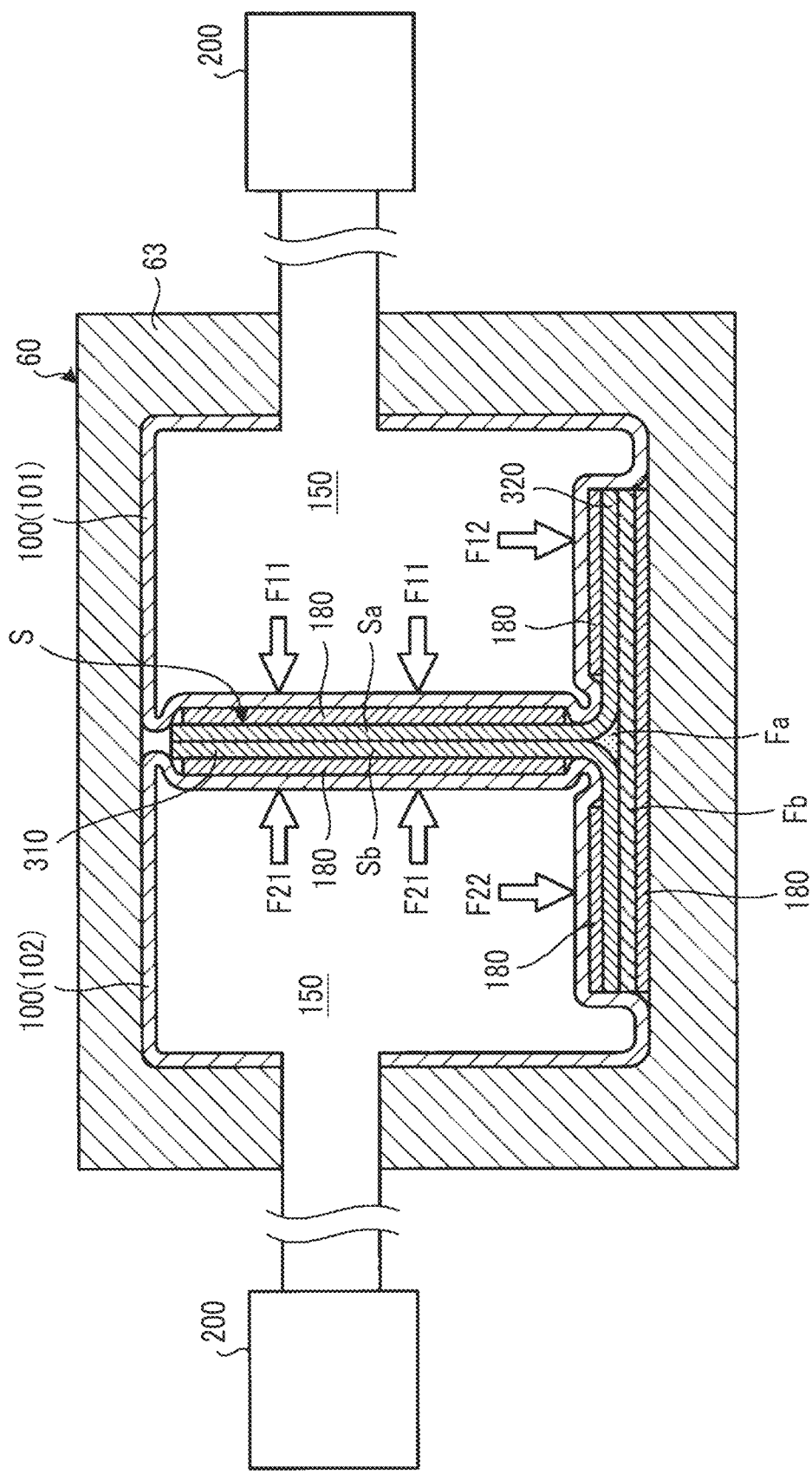
FIG. 7 is a sectional view schematically illustrating a mold according to the present embodiment.

In the above-described embodiment, each of the first plate portion 310 and the second plate portion 320 of the intermediate molded article S is interposed between the two bag bodies 100. As illustrated in FIG. 7, the first plate portion 310 may be interposed between the two bag bodies 100, and the second plate portion 320 may be interposed between the bag body 100 and the inner surface of the housing 63. FIG. 7 illustrates an example as follows. The first plate portion 310 is interposed between the bag body 101 and the bag body 102. A portion of the second plate portion 320 is interposed between the bag body 101 and the housing 63. A portion of the second plate portion 320 is interposed between the bag body 102 and the housing 63. In addition, the shaping member 180 is disposed on the inner surface of the housing 63 so as to come into contact with the reinforcing fiber sheet Fb.

Figure 8:
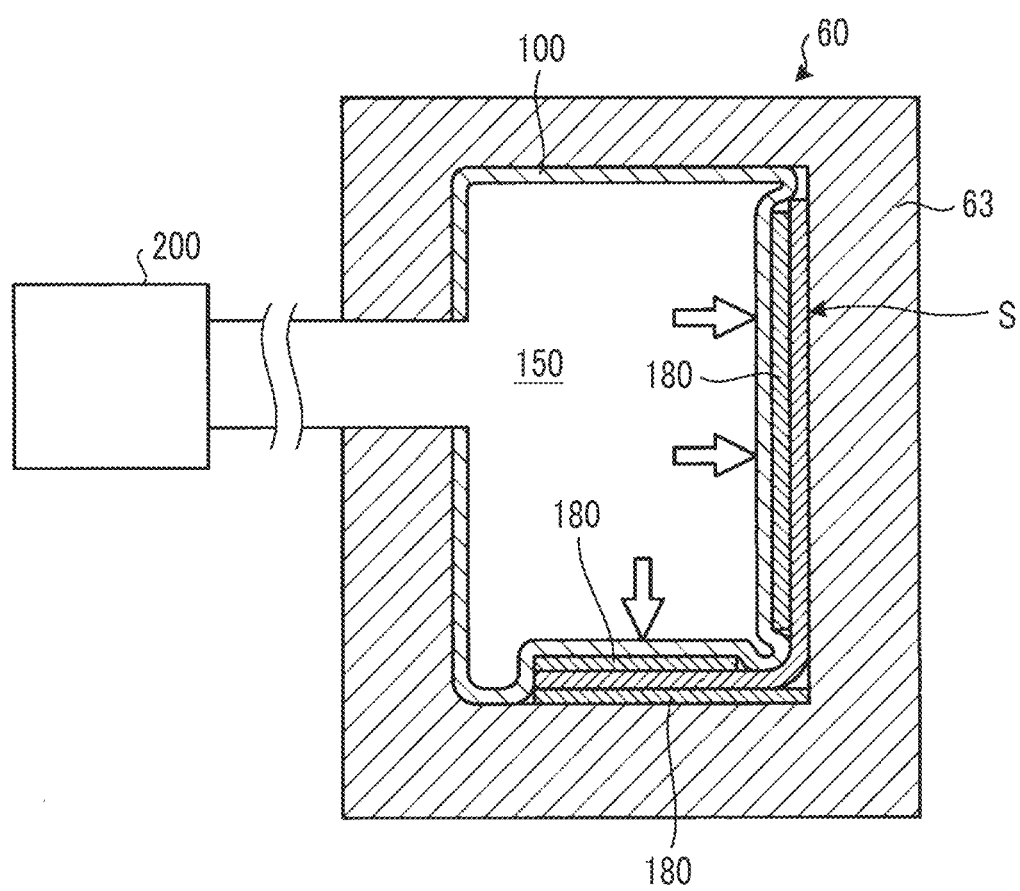
FIG. 8 is a sectional view schematically illustrating a mold according to the present embodiment.

In the above-described embodiment, a configuration is adopted so that the cross-sectional shape of the intermediate molded article S is a so-called T-shape, and is a line symmetrical shape. The cross-sectional shape of the intermediate molded article S may not be the line symmetrical shape. For example, as illustrated in FIG. 8, the cross-sectional shape of the intermediate molded article S may be a so-called L-shape. FIG. 8 illustrates an example in which the intermediate molded article S is interposed between the bag body 100 and the inner surface of the housing 63 without being interposed between the two bag bodies 100.

In the above-described embodiment, the shaping member 180 may be omitted. The bag body 100 may directly come into contact with the intermediate molded article S.

In the above-described embodiment, the temperature of the fluid in the internal space 150 of the bag body 100 may be adjusted so that the calorific values transmitted to the intermediate molded article S from each of the plurality of bag bodies 100 arranged in the pultruding direction of the intermediate molded article S are uniform.

In the above-described embodiment, for example, the heater may be disposed in the housing 63 and the intermediate molded article S may be heated by the heater.

In the above-described embodiment, the pressure member 100 may not be the bag body. For example, the pressure member 100 may be an elastically deformable spring or a member supported by the spring.

REFERENCE SIGNS LIST 1 production device,
10 first preforming unit,
11 reinforcing fiber sheet supply unit,
12 pressure roller,
13 supply reel,
20 second preforming unit,
21 reinforcing fiber sheet supply unit,
22 pressure roller,
23 supply reel,
30 gap material supply unit,
40 reinforcing fiber sheet supply unit,
43 supply reel,
50 third preforming unit,
52 pressure roller,
54 pressure roller,
60 mold, 61 entrance,
62 exit,
63 housing,
70 pultrusion device,
100 bag body,
150 internal space,
180 shaping member,
200 adjustment device,
210 pressure adjustment device,
220 temperature adjustment device,
310 first plate portion,
320 second plate portion,
Fa gap material,
Fb reinforcing fiber sheet,
Fc reinforcing fiber sheet,
Fd reinforcing fiber sheet,
K1 first bent portion,
K2 second bent portion,
S intermediate molded article,
Sa intermediate molded article,
Sa1 portion,
Sat portion,
Sb intermediate molded article,
Sb1 portion,
Sb2 portion,
Sc intermediate molded article

The invention claimed is:

1. A production device for a pultruded article, the device comprising:
   a mold that heats and cures an intermediate molded article having a reinforcing fiber impregnated with a thermosetting resin; and
   a pultrusion device that pultrudes a pultruded article produced by heating and curing the intermediate molded article in the mold, from the mold,
   wherein the mold has a pressure member which is elastically deformable and pressurizes the intermediate molded article,
   wherein the intermediate molded article is moved in a pultruding direction in the mold,
   wherein the pressure member includes a plurality of bag bodies each having an internal space and being arranged in the pultruding direction,
   wherein each of the plurality of bag bodies is elastically deformed from a first deformed state to a second deformed state so as to follow a change in an outer shape of the intermediate molded article moving in the pultruding direction,
   wherein the production device further comprises a pressure adjustment device that adjusts pressure of the internal space of each of the plurality of bag bodies so as to pressurize the intermediate molded article by using the same force in the first deformed state and the second deformed state,
   wherein each of the plurality of bag bodies is fixed to the mold, and
   wherein the production device further comprises a shaping member that is connected to each of the plurality of bag bodies, and that has a sliding surface slidable on a surface of the intermediate molded article so as to shape the intermediate molded article.

2. The production device for a pultruded article according to claim 1,
   wherein the bag body includes a first bag body and a second bag body located so as to interpose at least a portion of the intermediate molded article between the first bag body and the second bag body, and
   wherein the pressure adjustment device adjusts the pressure of an internal space of the first bag body and the pressure of an internal space of the second bag body so that the first bag body and the second bag body pressurize the intermediate molded article by using the same force.

3. The production device for a pultruded article according to claim 1, further comprising:
   a temperature adjustment device that adjusts a temperature of the pressure member,
   wherein the temperature adjustment device adjusts the temperature of the pressure member so that the intermediate molded article is heated and cured by using heat transferred to the intermediate molded article from the pressure member.

4. The production device for a pultruded article according to claim 3,
   wherein a plurality of the pressure members are disposed in the pultruding direction of the intermediate molded article, and
   wherein the temperature adjustment device adjusts the temperature of the plurality of pressure members so that mutually different calorific values are transferred to the intermediate molded article from each of the plurality of pressure members.

5. A production method for a pultruded article, the method comprising:
   introducing an intermediate molded article having a reinforcing fiber impregnated with a thermosetting resin into a mold, said introducing performed by preforming units;
   heating and pressurizing the intermediate molded article by using an elastically deformable pressure member disposed in the mold, said heating and pressurizing performed by the mold and a plurality of bag bodies; and
   pultruding a pultruded article produced by heating and curing the intermediate molded article in the mold, from the mold, said pultruding performed by a pultrusion device,
   wherein the intermediate molded article is moved in a pultruding direction in the mold,
   wherein the pressure member includes the plurality of bag bodies each having an internal space and being arranged in the pultruding direction,
   wherein each of the plurality of bag bodies is elastically deformed from a first deformed state to a second deformed state so as to follow a change in an outer shape of the intermediate molded article moving in the pultruding direction,
   wherein the production device further comprises a pressure adjustment device that adjusts pressure of the internal space of each of the plurality of bag bodies so as to pressurize the intermediate molded article by using the same force in the first deformed state and the second deformed state,
   wherein each of the plurality of bag bodies is fixed to the mold, and
   wherein the production device further comprises a shaping member that is connected to each of the plurality of bag bodies, and that has a sliding surface slidable on a surface of the intermediate molded article so as to shape the intermediate molded article.

6. The production device for a pultruded article according to claim 2,
   wherein the mold has a housing and the pressure member disposed inside the housing, the pressure member further comprises a third bag body, the first, the second and the third bag bodies are arranged around the intermediate molded article, and have first portions which come contact with an inner surface of the housing and second portions which come contact with the intermediate molded article, and the first portions are supported by the inner surface of the housing.

* * * * *